(12) United States Patent
Cheong et al.

(10) Patent No.: US 8,929,478 B2
(45) Date of Patent: Jan. 6, 2015

(54) APPARATUS AND METHOD FOR TRANSMITTING AND RECEIVING DATA IN COMMUNICATION SYSTEM

(71) Applicant: Electronics and Telecommunications Research Institute, Daejeon (KR)

(72) Inventors: Min-Ho Cheong, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/717,639

(22) Filed: Dec. 17, 2012

(65) Prior Publication Data

US 2013/0188747 A1 Jul. 25, 2013

(30) Foreign Application Priority Data

Dec. 15, 2011 (KR) ........................ 10-2011-0135742

(51) Int. Cl.
| | |
|---|---|
| *H04L 27/00* | (2006.01) |
| *H04L 25/02* | (2006.01) |
| *H04L 1/00* | (2006.01) |
| *H04L 1/06* | (2006.01) |

(52) U.S. Cl.
CPC .............. *H04L 25/02* (2013.01); *H04L 1/0031* (2013.01); *H04L 1/0003* (2013.01); *H04L 1/0009* (2013.01); *H04L 1/0675* (2013.01)
USPC .............. 375/295; 341/20; 341/173

(58) Field of Classification Search
USPC ........................................... 375/295
See application file for complete search history.

(56) References Cited

U.S. PATENT DOCUMENTS

| | | | |
|---|---|---|---|
| 2008/0298306 A1* | 12/2008 | Larsson ......................... | 370/328 |
| 2009/0310692 A1* | 12/2009 | Kafle et al. ..................... | 375/260 |
| 2012/0269183 A1* | 10/2012 | Sohn et al. ..................... | 370/338 |
| 2013/0250904 A1* | 9/2013 | Kang et al. ..................... | 370/329 |
| 2013/0294397 A1* | 11/2013 | Lee et al. ....................... | 370/329 |

FOREIGN PATENT DOCUMENTS

| | | |
|---|---|---|
| KR | 1020100138692 A | 12/2010 |
| WO | WO 2010/150950 A1 | 12/2010 |

* cited by examiner

Primary Examiner — Erin File

(57) ABSTRACT

An apparatus for transmitting data in a communication system includes: a receiving unit configured to receive feedback information for each of a plurality of stations (STAB) in response to a control frame; an adjusting unit configured to adjust links of the STAB at frequency channels based on the feedback information, and set optimal links for the respective STAB; and a transmitting unit configured to transmit data to the STAB through the optimal links, wherein the feedback information comprises one or more of optimal stream number information, optimal modulation and coding scheme (MCS) information, optimal bandwidth information, average signal-to-noise ratio (SNR) information, space-time information, optimal space-time block coding (STBC) information, group ID information, coding type information, and FB Tx type information.

18 Claims, 2 Drawing Sheets

| 102 | 104 | 106 | 108 | 110 | 112 | 114 | 116 | 118 | 120 |
|---|---|---|---|---|---|---|---|---|---|
| VHT | Reserved | MRQ | MSI | MFSI/GID-L | MFB | GID-H | Coding Type | FB Tx Type | Unsolicited MFB |

FIG. 1
| 102 | 104 | 106 | 108 | 110 | 112 | 114 | 116 | 118 | 120 |
|---|---|---|---|---|---|---|---|---|---|
| VHT | Reserved | MRQ | MSI | MFSI/ GID-L | MFB | GID-H | Coging Type | FB Tx Type | Unsolicited MFB |
FIG. 2
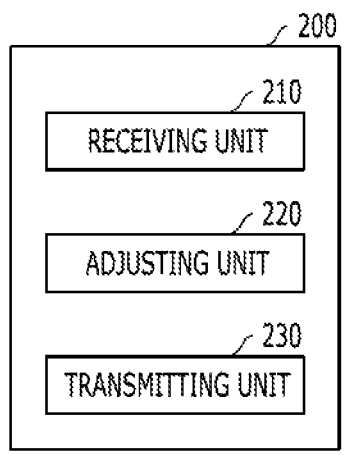
FIG. 3
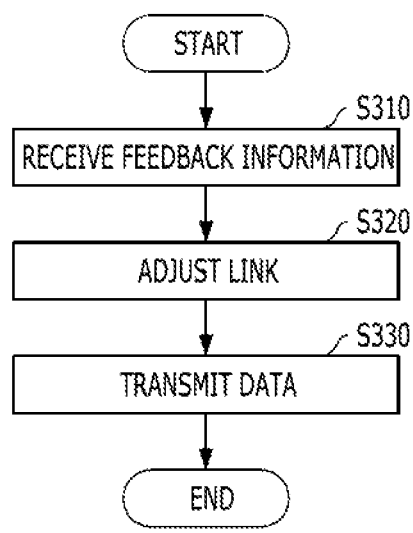

APPARATUS AND METHOD FOR TRANSMITTING AND RECEIVING DATA IN COMMUNICATION SYSTEM

CROSS-REFERENCE TO RELATED APPLICATIONS

The present application claims priority of Korean Patent Application No. 10-2011-0135742, filed on Dec. 15, 2011, which is incorporated herein by reference in its entirety.

BACKGROUND OF THE INVENTION

1. Field of the Invention

Exemplary embodiments of the present invention relate to a communication system; and, more particularly, to an apparatus and method for normally transmitting and receiving data by transmitting and receiving feedback information of a plurality of terminals, for example, stations (hereafter, referred to as 'STA') in a communication system.

2. Description of Related Art

In a current communication system, research has been actively conducted to provide various qualities of services (hereafter, referred to as 'QoS') of services having a high transmission rate to users. Examples of the communication system may include a wireless local area network (hereafter, referred to as 'WLAN') system. In the WLAN system, research has been actively conducted on a variety of methods for stably transmitting large-volume data at high speed through limited resources. Particularly, in a communication system, research has been conducted on data transmission through wireless channels. Recently, in the WLAN system, there have been proposed a variety of methods for normally transmitting and receiving large-volume data by effectively using limited wireless channels.

Meanwhile, in a current communication system, there have been proposed a variety of methods for transmitting and receiving large-volume data to and from a plurality of users by effectively using limited frequency channels. In order to normally and stably transmit and receive data to and from a plurality of terminals corresponding to a plurality of users, for example, STAB, optimal links for transmitting and receiving data to and from the STAB at a frequency channel must be set. In order to set the optimal links for transmitting and receiving data to and from the STAB, feedback information on the data transmission and reception to and from the STAB must be normally transmitted and received.

However, in a current communication system, for example, a WLAN system, a specific method for normally transmitting and receiving feedback information of a plurality of STAB to and from the STAB has not yet been proposed. In other words, as the feedback information of the respective STAB is not normally transmitted and received, the communication system has a limitation in setting optimal links for transmitting and receiving data to and from the STAB at the frequency channels. As a result, the data may not be normally transmitted to and received from the STAB.

Therefore, there is a demand for a method for normally transmitting and receiving feedback information of a plurality of STAB, in order to set optimal links at frequency channels in a communication system, for example, a WLAN system and thus normally transmit and receive large-volume data to and from the STAB.

SUMMARY OF THE INVENTION

An embodiment of the present invention is directed to an apparatus and method for transmitting and receiving data in a communication system.

Another embodiment of the present invention is directed to an apparatus and method for normally transmitting and receiving feedback information of a plurality of stations (STAB) in a communication system.

Another embodiment of the present invention is directed to an apparatus and method for normally transmitting and receiving feedback information for each of a plurality of STAB such that optimal links are set at frequency channels to normally transmit and receive data to and from the STAB in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting data in a communication system includes: a receiving unit configured to receive feedback information for each of a plurality of stations (STAB) in response to a control frame; an adjusting unit configured to adjust links of the STAB at frequency channels based on the feedback information, and set optimal links for the respective STAB; and a transmitting unit configured to transmit data to the STAB through the optimal links, wherein the feedback information includes one or more of optimal stream number information, optimal modulation and coding scheme (MCS) information, optimal bandwidth information, average signal-to-noise ratio (SNR) information, space-time information, optimal space-time block coding (STBC) information, group ID information, coding type information, and FB Tx type information.

In accordance with another embodiment of the present invention, an apparatus for receiving data in a communication system includes: a receiving unit configured to receive a control frame; a generating unit configured to generate feedback information for each of a plurality of STAs in response to the control frame; a transmitting unit configured to transmit the feedback information and transmit data through an optimal link set to each of the STAs at a frequency channel based on the feedback information, wherein the feedback information includes one or more of optimal stream number information, optimal MCS information, optimal bandwidth information, average SNR information, space-time information, optimal STBC information, group ID information, coding type information, and FB Tx type information.

In accordance with another embodiment of the present invention, a method for transmitting data in a communication system includes: receiving feedback information for each of a plurality of STAs in response to a control frame; setting optimal links for the respective STAs by adjusting links of the STAs at frequency channels based on the feedback information; and transmitting data to the STAs through the optimal links, wherein the feedback information includes one or more of optimal stream number information, optimal MCS information, optimal bandwidth information, average SNR information, space-time information, optimal STBC information, group ID information, coding type information, and FB Tx type information.

In accordance with another embodiment of the present invention, a method for receiving data in a communication system includes: receiving a control frame; generating feedback information for each of a plurality of STAs in response to the control frame; transmitting the feedback information, and transmitting data through optimal links set for the respective STAB at frequency channels based on the feedback information, and wherein the feedback information includes one or more of optimal stream number information, optimal MCS information, optimal bandwidth information, average SNR information, space-time information, optimal STBC information, group ID information, coding type information, and FB Tx type information.

BRIEF DESCRIPTION OF THE DRAWINGS

FIG. 1 is a diagram schematically illustrating the structure of a control frame in a communication system in accordance with an embodiment of the present invention.

FIG. 2 is a diagram schematically illustrating the configuration of an apparatus for transmitting data in a communication system in accordance with an embodiment of the present invention.

FIG. 3 is a flowchart schematically showing a data transmission operation of the apparatus for transmitting data in a communication system in accordance with the embodiment of the present invention.

DESCRIPTION OF SPECIFIC EMBODIMENTS

Figure 4:
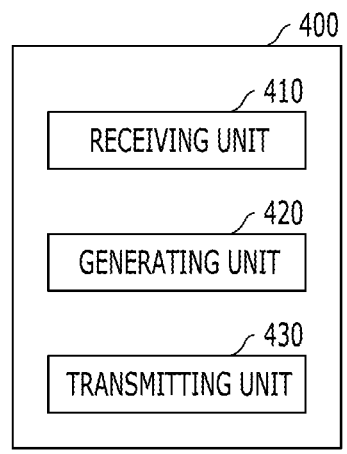
FIG. 4 is a diagram schematically illustrating the configuration of an apparatus for receiving data in the communication system in accordance with the embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The embodiments of the present invention provide an apparatus and method for transmitting and receiving data in a communication system, for example, a WLAN system. In the embodiments of the present invention, the WLAN system will be taken as an example for description. However, the apparatus and method for transmitting and receiving data in accordance with the embodiments of the present invention may be applied to other communication systems.

Furthermore, the embodiments of the present invention provide an apparatus and method for transmitting and receiving data to and from a plurality of terminals corresponding to a plurality of users, for example, stations (hereafter, referred to as 'STAs') in a communication system such as a WLAN system, for example, an IEEE 802.11ac system. In the embodiments of the present invention, data are normally transmitted and received through frequency channels between a base station, for example, an access point (hereafter, referred to as 'AP') and a plurality of STAs.

At this time, in order to normally transmit and receive large-volume data to and from a plurality of STAs through frequency channels in a communication system, for example, a WLAN system, feedback information is normally transmitted to and received from the STAs, links of the STAs at the frequency channels are adjust on the basis of the feedback information so as to set optimal links for the respective STAs, and large-volume data are normally transmitted to and received from the STAs through the set optimal links. Here, in the communication system in accordance with the embodiment of the present invention, for example, a WLAN system, a data transmitting apparatus, for example, an indicator transmits a control frame to a plurality of data receiving apparatuses, for example, a plurality of STAs as responders through frequency channels. The STAs receive the control frame, and then transmit their feedback information to the indicator, that is, the data transmitting apparatus. Furthermore, the data transmitting apparatus adjusts the links of the STAs at the frequency channels based on the feedback information, and sets optimal links for the respective STAB. Then, the data transmitting apparatus transmits and receives data through the set optimal links. Now, referring to FIG. 1, a control frame in a communication system in accordance with an embodiment of the present invention will be described in detail.

FIG. 1 is a diagram schematically illustrating the structure of a control frame in a communication system in accordance with an embodiment of the present invention. FIG. 1 schematically illustrates the structure of a very high throughput (VHT)-format high throughput (HT) control frame in the communication system in accordance with the embodiment of the present invention.

Referring to FIG. 1, the control frame includes a VHT subfield 102 to indicate VHT, a reserved subfield 104, a modulation and coding scheme request (MCSQ) subfield 106 to indicate a request of MCS feedback, an MSI subfield 108 to indicate a sequence identifier of the MCSQ 106, an MFSI/GID-L field 110 to indicate the least significant bit (LSB) of a sequence identifier/group ID of the MSC feedback, an MFB subfield 112 to indicate a bandwidth (BW) of the MCS feedback, a GID-H subfield 114 to indicate the most significant bit (MSB) of a group ID, a coding type subfield 116 to indicate a coding type of MFB response, an FB Tx type subfield 118 to indicate a transmission type of MFB response, and an unsolicited MFB subfield 120 to indicate a response to MCS feedback. The respective subfields of the control frame may be described in more detail with reference to Table 1 below.

TABLE 1

| Subfield | Meaning | Definition |
| --- | --- | --- |
| MRQ | MCS request | Set to 1 to request MCS feedback (solicited MFB), otherwise set to 0. |
| MSI | MRQ sequence identifier | When the MRQ subfield is set to 1, the MSI subfield contains a sequence number in the range 0 to 6 that identifies the specific request. When the MRQ subfield is set to 0, the MSI subfield is reserved. |
| MFSI/GID-L | MFB sequence identifier/LSB of Group ID | If the Unsolicited MFB subfield is set to 0, the MFSI/GID-L subfield contains the received value of MSI contained in the frame to which the MFB information refers.<br>If the Unsoheited MFB subfield is set to 1, the MFSI/GID-L subfield contains the lowest 3 bits of Group ID of the PPDU to which the unsolicited MFB refers. |

TABLE 1-continued

| Subfield | Meaning | Definition |
| --- | --- | --- |
| MFB | VHT N_STS, MCS BW and SNR feedback | MFB subfield is interpreted as defined in Table S-ac2 (MFB subfield in the VHT format HT Control field). This subfield contains the recommended MFB. The value of MCS = 15 and VHT N_STS = 7 indicates that no feedback is present. |
| GID-H | MSB of Group ID | If the Unsolicited MFB subfield is set to 1, the GID-H subfield contains the highest 3 bits of Group ID of the PPDU to which the unsolicited MFB refers. Otherwise this subfield is reserved. |
| Coding Type | Coding type of MFB response | If the Unsolicited MFB subfield is set to 1, the Coding Type subfield contains the Coding information (set to 0 for BCC and set to 1 for LDPC) to which the unsolicited MFB refers. Otherwise this subfield is reserved. |
| FB Tx Type | Transmission type of MFB response | If the Unsolicited MFB subfield is set to 1 and FB Tx Type subfield is set to 0, the unsolicited MFB refers to either an unbeamformed VHT PPDU or transmit diversity using an STBC VHT PPDU. If the Unsolicited MFB subfield is set to 1 and the FB Tx Type subfield is set to 1, the unsolicited MFB refers to a beamformed SU-MIMO VHT PPDU. Otherwise this subfield is reserved. |
| Unsolicited MFB | Unsolicited MCS feedback indicator | Set to 1 if the MFB is not a response to an MRQ. Set to 0 if the MFB is a response to an MRQ. |

Now, referring to FIG. 2, an apparatus for transmitting data in a communication system in accordance with an embodiment of the present invention will be described in detail.

FIG. 2 is a diagram schematically illustrating the configuration of an apparatus for transmitting data in a communication system in accordance with an embodiment of the present invention. FIG. 2 schematically illustrates the configuration of an indicator to receive feedback information of STAB, for example, MCS feedback information in a communication system in accordance with the embodiment of the present invention.

Referring to FIG. 2, the data transmitting apparatus 200, that is, the indicator includes a receiving unit 210, an adjusting unit 220, and a transmitting unit 230. The receiving unit 210 is configured to receive feedback information from a data receiving apparatus, that is, a responder. The adjusting unit 220 is configured to adjust a link of the data receiving apparatus at a frequency channel based on the feedback information and set an optimal link. The transmitting unit 230 is configured to transmit data to the data receiving apparatus through the set optimal link.

The transmitting unit 230 transmits a control frame as described with reference to FIG. 1 to a data receiving apparatus, for example, a responder such that the responder transmits feedback information, for example, MCS feedback information. Since the control frame has been described above, the detailed descriptions thereof are omitted herein.

Furthermore, the receiving unit 210 receives feedback information, that is, feedback information for each of a plurality of STAB from the responder. The feedback information as MCS feedback information includes optimal stream number information, optimal MCS information, optimal bandwidth information, average signal-to-noise ratio (SNR) information, space-time information, optimal space-time block coding (STBC) information, group ID information, coding type information, FB Tx type information and the like.

The receiving unit 210 receives the above-described MCS feedback information for each of the STAB. At this time, the receiving unit 210 may distinguish the received MCS feedback information for each MCS. Furthermore, since optimal bandwidths of the respective STAB may overlap each other, the optimal bandwidth information contains list information on a plurality of optimal bandwidths. The MCS feedback information includes the above-described information, for example, the optimal MCS information and the average SNR information for each STA, each time-space stream, and each unit bandwidth of the bandwidth. More specifically, the optimal MCS information and the average SNR information in the MCS feedback information includes MCS information and average SNR information for each sub bandwidth at the optimal bandwidth contained in the optimal bandwidth information. Here, the average SNR information includes average SNR information for each optimal stream number contained in the optimal stream number information. Furthermore, the group ID information contains information on group ID change and candidate group IDs when the group ID is changed, in order to normally transmit and receive data according to multi user-multi input multi output (MU-MIMO).

The adjusting unit 220 sets optimal links for transmitting and receiving data to and from the responders, that is, a plurality of STAB at frequency channels, based on the feedback information received from the responder. The transmitting unit 230 and the receiving unit 210 normally transmit and receive large-volume data to and from the responders, that is, the plurality of STAB through the set optimal links. Now, referring to FIG. 3, a data transmission operation in the communication system in accordance with the embodiment of the present invention will be described in detail.

FIG. 3 is a flowchart schematically showing a data transmission operation of the apparatus for transmitting data in a communication system in accordance with the embodiment of the present invention. FIG. 3 schematically shows a data transmission process of the indicator to receive feedback information of STAB, for example, MCS feedback information in the communication system in accordance with the embodiment of the present invention.

Referring to FIG. 3, the data transmitting apparatus, that is, the indicator receives feedback information from a data receiving apparatus, that is, a responder at step S310. The data transmitting apparatus, that is, the indicator receives the feedback information, that is, feedback information for each of a plurality of STAs from the responder, in response to a control frame to control the responder to transmit the feedback information, for example, MCS feedback information, as described with reference to FIG. 1. At this time, since the MCS feedback information received from the responder has been described above, the detailed descriptions thereof are omitted herein.

At step S320, the indicator adjusts links of the responders, that is, the plurality of STAs at frequency channels, based on the feedback information received from the responder, and sets optimal links for transmitting and receiving data to and from the STAs.

At step S330, the indicator normally transmits and receives large-volume data to and from the responders, that is, the plurality of STAs through the set optimal links. Now, referring to FIG. 4, an apparatus for receiving data in a communication system in accordance with the embodiment of the present invention will be described in detail.

FIG. 4 is a diagram schematically illustrating the configuration of an apparatus for receiving data in a communication system in accordance with the embodiment of the present invention. FIG. 4 schematically illustrates the configuration of a responder to transmit feedback information of STAs, for example, MCS feedback information in the communication system in accordance with the embodiment of the present invention.

Referring to FIG. 4, the data receiving apparatus 400, that is, a responder includes a receiving unit 410, a generating unit 420, and a transmitting unit 430. The receiving unit 410 is configured to receive a control frame as described with reference to FIG. 1 from a data transmitting apparatus, that is, an indicator through a frequency channel. The generating unit 420 is configured to generate feedback information in response to the control frame. The transmitting unit 430 is configured to transmit the generated feedback information to the indicator. The receiving unit 410 and the transmitting unit 430 transmit and receive data to and from the indicator through an optimal link for the responder, which is set based on the feedback information transmitted to the indicator.

The generating unit 420 generates feedback information in response to the control frame received from the indicator. The feedback information as MCS feedback information includes optimal stream number information, optimal MCS information, optimal bandwidth information, average SNR information, space-time information, optimal STBC information, group ID information, coding type information, FB Tx type information and the like.

The generating unit 420 generates the feedback information such that the indicator distinguishes MCS feedback information for each of the STAB for each MCS. Since the optimal bandwidths for the respective STAB may overlap each other, the optimal bandwidth information contains list information on a plurality of optimal bandwidths. Furthermore, the MCS feedback information contains the above-described information, for example, the optimal MCS information, the average SNR information and the like for each of the STAB, each time-space stream, and each sub bandwidth of the bandwidth. More specifically, the optimal MCS information and the average SNR information in the MCS feedback information contain MCS information and average SNR information for each sub bandwidth at the optimal bandwidth contained in the optimal bandwidth information. The average SNR information includes average SNR information for each of optimal stream numbers contained in the optimal stream number information. Furthermore, the group ID information contains information on group ID change and candidate group IDs when the group ID is changed, in order to normally transmit and receive data according to MU-MIMO.

The transmitting unit 430 transmits the MCS feedback information for each of the STAB to the indicator, and the receiving unit 410 and the transmitting unit 430 normally transmit and receive large-volume data to and from the indicator through the optimal link set at the frequency channel based on the MCS feedback information. Now, referring to FIG. 5, a data receiving operation in the communication system in accordance with the embodiment of the present invention will be described in detail.

Figure 5:
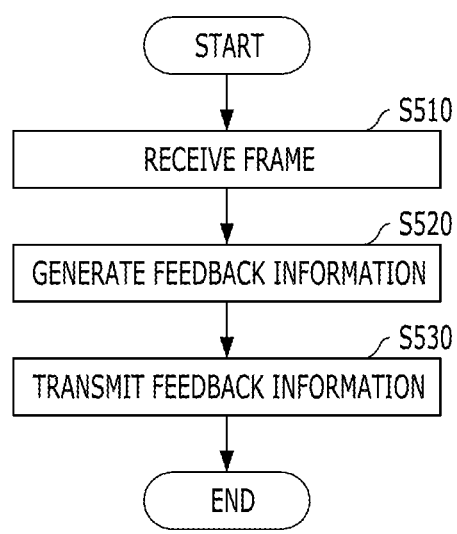
FIG. 5 is a flowchart schematically showing a data reception operation of the apparatus for receiving data in a communication system in accordance with the embodiment of the present invention.

FIG. 5 is a flowchart schematically showing a data reception operation of the apparatus for receiving data in a communication system in accordance with the embodiment of the present invention. FIG. 5 schematically shows a data reception process of a responder which receives data by transmitting feedback information of STAB, for example, MCS feedback information in the communication system in accordance with the embodiment of the present invention.

Referring to FIG. 5, the data receiving apparatus, that is, the responder receives a control frame as described with reference to FIG. 1 from the data transmitting apparatus, that is, the indicator at step S510.

At step S520, the responder generates feedback information, that is, MCS feedback information in response to the control frame. Here, since the MCS feedback information has been described above, the detailed descriptions thereof are omitted herein.

At step S530, the responder transmits the feedback information to the indicator so as to normally transmit and receive large-volume data to and from the indicator through an optimal link set at a frequency channel based on the feedback information.

In the communication system in accordance with the embodiment of the present invention, the indicator receives feedback information for each of the STAB from the responder, sets an optimal link for the responder by adjusting link of the responder at a frequency channel based on the received feedback information, and transmits and receive data to and from the responders, that is, the STAs through the set optimal link. The responders transmit the MCS feedback information as feedback information to the indicator, and the MCS feedback information includes optimal stream number information, optimal MCS information, optimal bandwidth information, average SNR information, space-time information, optimal STBC information, group ID information, coding type information, FB Tx type information and the like.

At this time, the indicator receives the above-described MCS feedback information for each of the STAs, and distinguishes the received MCS feedback information for each MCS. Since the optimal bandwidths for the respective STAs may overlap each other, the optimal bandwidth information includes list information on a plurality of optimal bandwidths. Furthermore, the MCS feedback information includes the above-described information, for example, the optimal MCS information, the average SNR information and the like for each of the STAS, each time-space stream, and each sub bandwidth of the bandwidth. More specifically, the optimal MCS information and the average SNR information in the MCS feedback information contain MCS information and average SNR information for each sub bandwidth at the optimal bandwidth contained in the optimal bandwidth information. The average SNR information includes average SNR information for each of optimal stream numbers contained in the optimal stream number information. Furthermore, the group ID information contains information on group ID change and candidate group IDs when the group ID is changed, in order to normally transmit and receive data according to MU-MIMO.

In the communication system in accordance with the embodiment of the present invention, as the feedback information of the plurality of STAB is normally received from the STAB, the links of the STAB at frequency channels are adjusted to set optimal links according to the feedback information of the STAB. Accordingly, large-volume data may be normally transmitted and received.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system, comprising:
a receiving unit configured to receive first feedback information for a first station (STA) of a plurality of stations (STAs) and to receive second feedback information for a second STA of the plurality of STAs;
an adjusting unit configured to adjust links of the first STA at frequency channels based on the first feedback information and the second feedback information, adjust links of the second STA at frequency channels based on the first feedback information and the second feedback information, and set optimal links for the respective STAs; and
a transmitting unit configured to transmit data to the STAs through the optimal links,
wherein the each of the first and second feedback information comprises one or more of optimal stream number information, optimal modulation and coding scheme (MCS) information, optimal bandwidth information, average signal-to-noise ratio (SNR) information, space-time information, optimal space-time block coding (STEC) information, group ID information, coding type information, and Feedback Transmission (FB Tx) type information.

2. The apparatus of claim 1, wherein the optimal MCS information contains MCS information for each sub bandwidth at an optimal bandwidth contained in the optimal bandwidth information.

3. The apparatus of claim 1, wherein the average SNR information contains average SNR information for each sub bandwidth at an optimal bandwidth contained in the optimal bandwidth information and for each optimal stream number contained in the optimal stream number information.

4. The apparatus of claim 1, wherein the optimal bandwidth information contains list information on a plurality of optimal bandwidths.

5. The apparatus of claim 1, wherein the group ID information contains information on group ID change and candidate group IDs corresponding to the group ID change, in response to data transmission and reception based on multi user-multi input multi output (MU-MIMO).

6. An apparatus for receiving data in a communication system, comprising:
a receiving unit configured to receive a control frame;
a generating unit configured to generate feedback information in response to the control frame;
a transmitting unit configured to transmit the feedback information and receive data through an optimal link at a frequency channel based on the feedback information,
wherein the feedback information comprises optimal bandwidth information, the optimal bandwidth information including list information on a plurality of optimal bandwidths.

7. The apparatus of claim 6, wherein the feedback information further comprises optimal MCS information including MCS information for each sub bandwidth at an optimal bandwidth contained in the optimal bandwidth information.

8. The apparatus of claim 7, wherein the feedback information further comprises optimal stream number information and average SNR information including average SNR information for each sub bandwidth at an optimal bandwidth contained in the optimal bandwidth information and for each optimal stream number contained in the optimal stream number information.

9. The apparatus of claim 8, wherein the feedback information further comprises group ID information contains including information on group ID change and candidate group IDs corresponding to the group ID change, in response to data transmission and reception based on MU-MIMO.

10. A method for transmitting data in a communication system, comprising:
receiving first feedback information for a first station (STA) of a plurality of STAs and second feedback information for a second station (STA) of the plurality of STAs;
setting optimal links for the first STA by adjusting links of the first STA at frequency channels based on the first feedback information and the second feedback information; and
transmitting data to the first STA through the optimal links,
wherein the each of the first and second feedback information comprises one or more of optimal stream number information, optimal MCS information, optimal bandwidth information, average SNR information, space-time information, optimal STBC information, group ID information, coding type information, and Feedback Transmission (FB Tx) type information.

11. The method of claim 10, wherein a one of the first and second feedback information comprises the optimal MCS information and the optimal bandwidth information, and the optimal MCS information contains MCS information for each sub bandwidth at an optimal bandwidth contained in the optimal bandwidth information.

12. The method of claim 11, wherein the one of the first and second feedback information comprises the average SNR information and the optimal stream number information, and the average SNR information contains average SNR information for each sub bandwidth at an optimal bandwidth contained in the optimal bandwidth information and for each optimal stream number contained in the optimal stream number information.

13. The method of claim 12, wherein the optimal bandwidth information contains includes list information on a plurality of optimal bandwidths.

14. The method of claim 13, wherein the one of the first and second feedback information comprises the group ID information, and the group ID information includes information on group ID change and candidate group IDs corresponding to the group ID change, in response to data transmission and reception based on MU-MIMO.

15. A method for receiving data in a communication system, comprising:
receiving a control frame;
generating feedback information in response to the control frame;
transmitting the feedback information; and
receiving data through optimal links at frequency channels based on the feedback information,
wherein the feedback information comprises optimal bandwidth information and one or more of optimal stream number information, optimal MCS information, average SNR information, space-time information, optimal STBC information, group ID information, coding type information, and Feedback Transmission (FB Tx) type information, and wherein the optimal bandwidth information contains list information on a plurality of optimal bandwidths.

16. The method of claim 15, wherein the optimal MCS information contains MCS information for each sub bandwidth at an optimal bandwidth contained in the optimal bandwidth information.

17. The method of claim 15, wherein the average SNR information contains average SNR information for each sub bandwidth at an optimal bandwidth contained in the optimal bandwidth information and for each optimal stream number contained in the optimal stream number information.

18. The method of claim 15, wherein the group ID information contains information on group ID change and candidate group IDs corresponding to the group ID change, in response to data transmission and reception based on MU-MIMO.

* * * * *